(12) United States Patent
Altree

(10) Patent No.: US 7,027,092 B2
(45) Date of Patent: Apr. 11, 2006

(54) IMAGE CAPTURE AND STORAGE DEVICE

(75) Inventor: Michael Altree, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 09/953,988

(22) Filed: Sep. 17, 2001

(65) Prior Publication Data
US 2003/0052983 A1 Mar. 20, 2003

(51) Int. Cl.
H04N 5/228 (2006.01)

(52) U.S. Cl. ............... 348/308.1; 348/294; 250/208.1

(58) Field of Classification Search ............... 348/308, 348/294, 298, 311, 312, 316, 317, 318, 319; 358/213.11, 213.22; 257/292; 356/501; 250/208.1
See application file for complete search history.

(56) References Cited

U.S. PATENT DOCUMENTS 4,831,453 A * 5/1989 Takemura .................. 348/296
5,665,959 A * 9/1997 Fossum et al. ........... 250/208.1
5,781,234 A * 7/1998 David et al. ................. 348/319
6,028,299 A * 2/2000 Hirama et al. ............ 250/208.1
6,057,539 A * 5/2000 Zhou et al. ............... 250/208.1
6,081,294 A * 6/2000 Cooper .................... 348/221.1
6,084,659 A * 7/2000 Tulet et al. ................. 348/311

* cited by examiner

Primary Examiner—David L. Ometz
Assistant Examiner—Gevell Selby

(57) ABSTRACT

An integrated image capture and storage device is provided. The image capture and storage device comprises a first memory layer, a second memory layer disposed below the first memory layer, and an image capture layer disposed above the first and second memory layers. The first memory layer has a plurality of first memory elements, the second memory layer has a plurality of second memory elements, and the image capture layer has a plurality of image capture elements. Each image capture element is in electrical communication with a corresponding first memory element to allow image data generated by each image capture element to be stored in its corresponding first memory element, and each first memory element is in electrical communication with a corresponding second memory element to allow data stored in each first memory element to be moved to its corresponding second memory element.

24 Claims, 2 Drawing Sheets

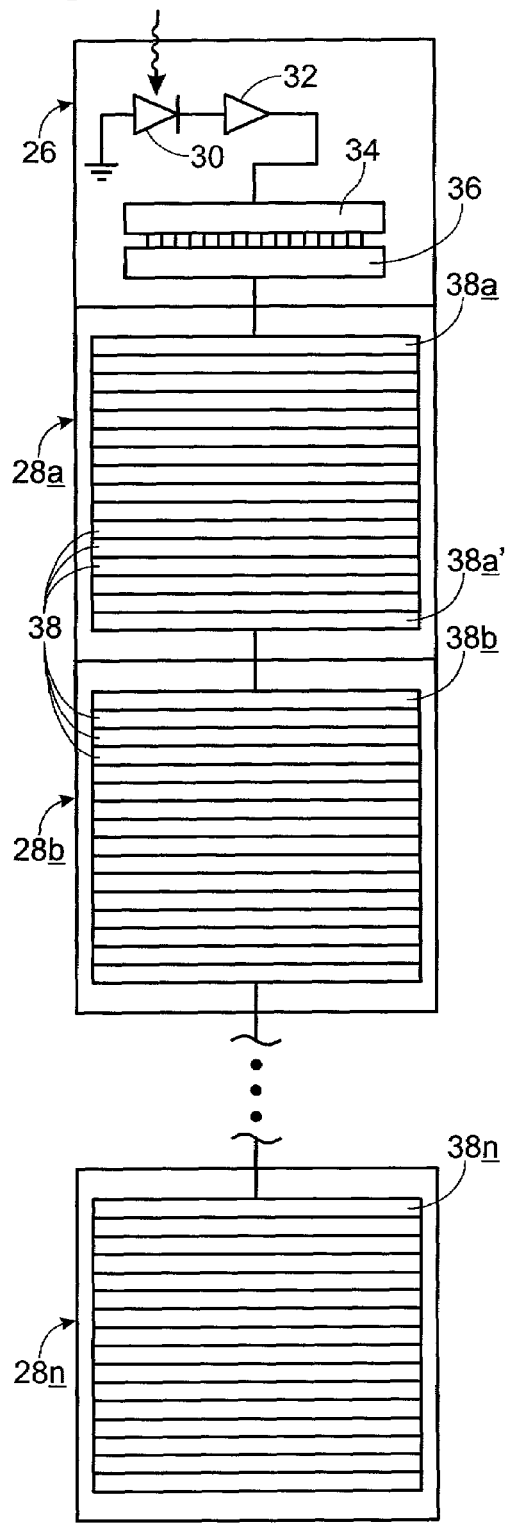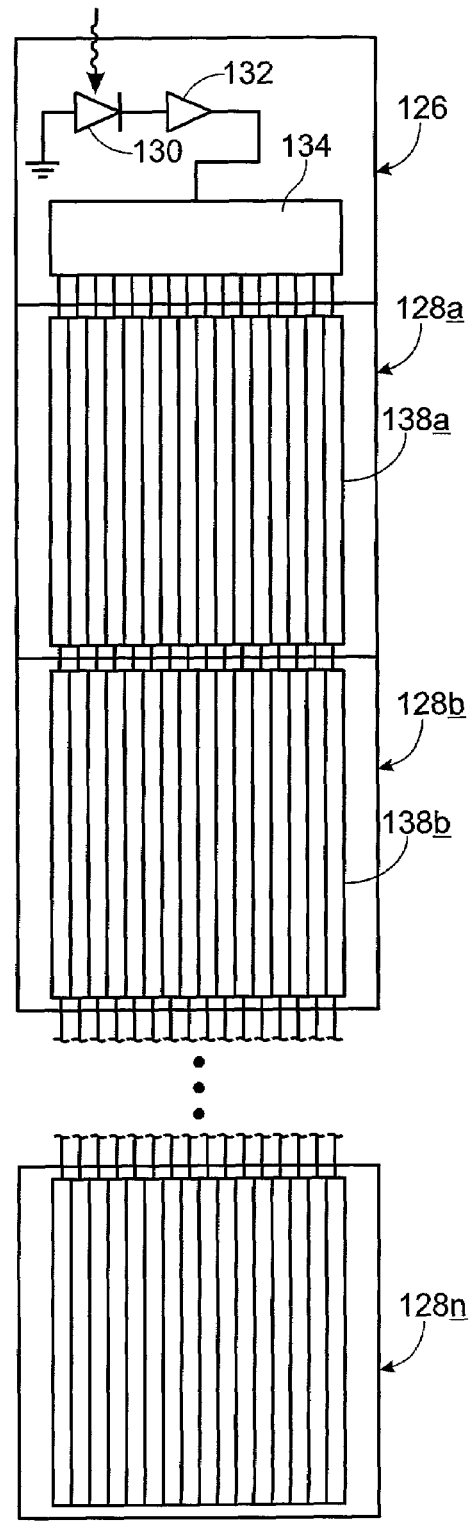

IMAGE CAPTURE AND STORAGE DEVICE

TECHNICAL FIELD

The present invention relates to an electronic image capture and storage device. More particularly, the invention provides an integrated image capture and storage device with improved operating speed and image storage capabilities.

BACKGROUND OF THE INVENTION

Solid state cameras, which have been popular for many years in scientific, military and other specialized fields, are becoming increasingly popular for general consumer use. This increased popularity has come with improvements in technology and reductions in camera cost.

Solid state cameras include many components that cooperate to capture an optical image for storage in an electronic format. For example, a solid state camera typically includes an array for converting an optical signal to an electrical signal, an optical system for focusing an image onto the array, processing circuitry for processing the image, and memory for storing the image. The camera may also include a display for viewfinding and playback functions.

Several different types of solid state cameras are known. These generally differ in the type of array used in the camera. Arrays are integrated solid state devices, and are typically fabricated on a semiconductor substrate. The two most popular types of arrays are charge coupled device (CCD) arrays and complementary metal oxide semiconductor (CMOS) arrays. Each of these arrays typically includes a large number of individual image-capture elements, or pixels, arranged in a two-dimensional pattern of rows and columns. Each image capture element includes a photodiode or other photodetector that, when illuminated, produces an electric charge proportional to the intensity of the illumination. The electric charge from each image capture element is then processed to form the digital image.

CCD arrays are the oldest and most commonly used type of solid state array. The term "charge-coupled device" describes how a CCD array moves the charges produced at each pixel into the downstream processing and memory circuitry. Besides the array of light-sensitive pixels, a CCD array also includes at least one horizontal row, or register, of non-light sensitive conductive elements positioned adjacent an outermost row of pixels. After exposure of the array to an optical signal, the charges in the outermost row are simultaneously moved to the horizontal register, and the charges in all of the other rows simultaneously shift one row toward the horizontal register. The charges in the horizontal register are then moved in serial fashion to downstream processing circuitry, where they are converted into digital format. These steps are repeated until all charges have been read from the array.

Different sub-types of CCD arrays may utilize various modifications to the basic CCD method of operation to improve camera performance. For example, two types of CCD arrays, known as frame transfer arrays and interline transfer arrays, include an array of storage cells located adjacent the array of pixels, wherein the array of storage cells includes one storage cell for each pixel. After exposure, the charge from each pixel is transferred into its corresponding storage cell. Then, the charges are moved from the storage cells into the processing circuitry in typical CCD fashion. The two types of arrays differ in the positioning of the storage cells relative to the pixels.

CMOS arrays, though developed more recently than CCD arrays, have become increasingly popular due to several advantages they offer over CCD arrays. For example, compared to CCD arrays, CMOS arrays can operate at a lower voltage and consume less power. Also, the pixels in a CMOS array are individually addressable. Furthermore, because CMOS arrays may be manufactured utilizing standard CMOS technology, active circuit elements may be integrated into each pixel, allowing pixel-level image processing. This also allows ordinary CMOS fabrication installations to be used to make the CMOS image sensors, allowing for improved economies of scale compared to the manufacture of CCD arrays.

Although current CMOS systems offer improvements to CCD systems in some areas, CMOS systems also share some common drawbacks with CCD systems. For example, CMOS arrays cannot begin a new image capture cycle ("integration") until the charge from the previous integration has been read from each image capture element and processed. This is typically done in serial or partially parallel fashion. Some cameras have buffers to hold data from a few exposures before processing, but these are generally too small to hold many exposures. Moreover, each pixel cannot be read and processed until the previous pixel has been read, processed and stored. Thus, the transfer, processing and storage of data acts as a bottleneck that slows down the capture of subsequent images. This delay may be undesirably long for applications such as video, or for cameras with a large number of pixels.

SUMMARY OF THE INVENTION

The present invention provides an integrated image capture and storage device. The image capture and storage device includes a first memory layer, a second memory layer disposed below the first memory layer, and an image capture layer disposed above the first and second memory layer. The first memory layer has a plurality of first memory elements, the second memory layer has a plurality of second memory elements, and the image capture layer has a plurality of image capture elements. Each image capture element is in electrical communication with a corresponding first memory element to allow image data generated by each image capture element to be stored in its corresponding first memory element, and each first memory element is in electrical communication with a corresponding second memory element to allow data stored in each first memory element to be moved to its corresponding second memory element.

BRIEF DESCRIPTION OF THE DRAWINGS

FIG. 3 is a schematic representation of a single image capture element and its associated memory elements of the memory structure shown in FIG. 2.

FIG. 4 is a schematic representation of a single image capture element and its associated memory elements according to a second embodiment of the present invention.

DETAILED DESCRIPTION OF THE PREFERRED EMBODIMENTS

Figure 1:
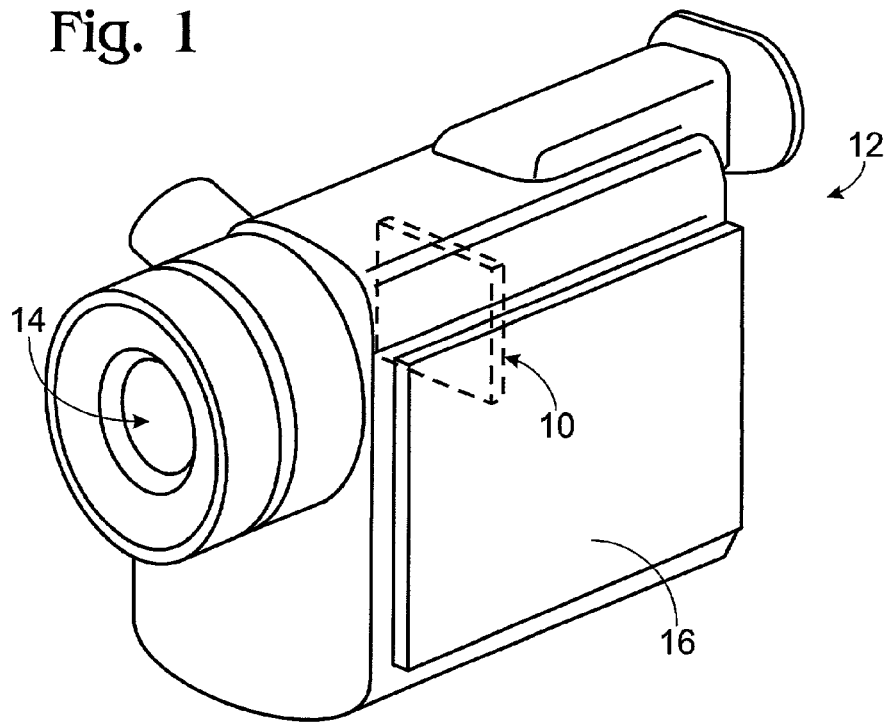
FIG. 1 is an isometric view of a first embodiment of an image capture and storage device according to the present invention, situated in a camera.

One embodiment of an image capture and storage device according to the present invention is shown generally in FIG. 1 at 10, positioned within the interior of a hand-held video camera 12. Video camera 12 also includes a lens system 14 for focusing an image on image capture and storage device 10, and a casing 16 for blocking any undesired light from reaching image capture and storage device 10. While the exemplary embodiment is shown in the context of a hand-held video camera, it will be appreciated that an image capture and storage device according to the present invention may be used in any type of solid state camera, and in any size camera, large or small.

Figure 2:
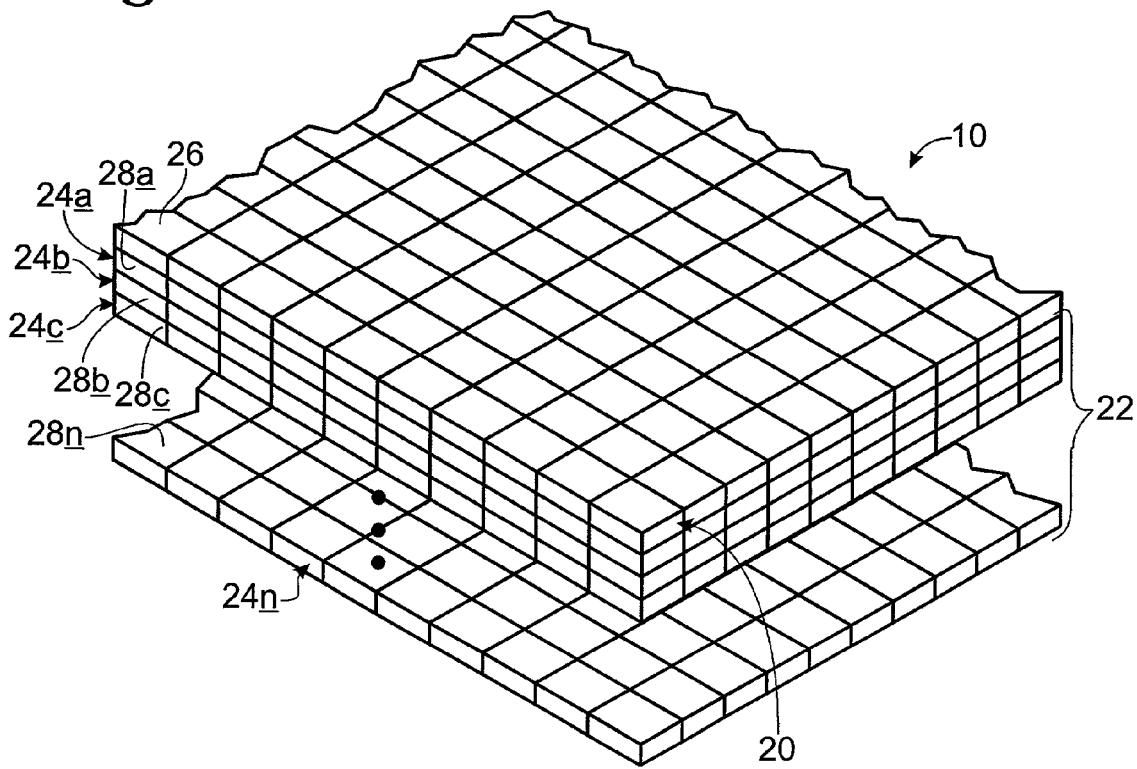
FIG. 2 is an enlarged schematic representation of the image capture layer and parallel memory structure of FIG. 1.

FIG. 2 shows a schematic representation of a suitable architecture for image capture and storage device 10. Image capture and storage device 10 includes an image capture structure, or layer 20, disposed on the surface of image capture device 10, and a parallel memory structure 22 positioned beneath image capture layer 20. Parallel memory structure 22 includes a plurality of individual memory layers 24a, 24b, 24c, . . . 24n. Parallel memory structure 22 and image capture layer 20 are typically formed on a suitable substrate, for example a semiconductor substrate such as silicon. Because image capture layer 20 may include active electronics, as described in more detail below, CMOS fabrication methods may be preferred fabrication methods for image capture device 10. However, any other suitable fabrication method may also be used. Examples of other memory and storage technologies that may be suitable for use as they become more available include magnetic random access memory (MRAM) and atomic resolution storage (ARS).

Image capture layer 20 includes a plurality of individual image capture elements 26. Each image capture element 26 is configured to produce an electrical charge proportional to the radiant intensity of light directed onto the image capture element by lens system 14. Therefore, each image capture element 26 generally will have a photodetector such as a photogate or a photodiode. Each image capture element may also include active processing circuitry, such as amplifiers, analog-to-digital converters, or combinatorial logic circuits such as data compression circuits, etc. The incorporation of processing circuitry into each image capture element 26 allows the charge produced in image capture elements 26 to be processed in parallel, thus helping to reduce the waiting time between integrations.

The processing circuitry may be positioned at any desired location within an image capture element 26. For example, it may be positioned along side of the photodiode or photogate at the surface of image capture element 26, or may be positioned beneath the photodiode or photogate. It may be preferable to fabricate image capture and storage device 10 so that at least some processing circuitry is positioned beneath the photodiode or photogate to allow the use of a larger photosensitive surface area with image capture structure 20.

Along with image capture structure 20, parallel memory structure 22 also helps to increase the speed of the image capture and storage process. As mentioned above, each memory layer (24a, 24b, 24c, . . . 24n) of parallel memory structure 22 includes a plurality of individual memory elements 28. Each memory element 28 is electrically isolated from other memory elements in the same layer (in that data generally does not flow directly between memory elements of the same layer), but is in electrical communication with corresponding memory elements in each of the adjacent memory layers. This allows data from any one image capture element 26 to flow directly into and through a linear series of memory elements 28a, 28b, 28c, . . . 28n associated with the particular image capture element. Because each image capture element has its own corresponding memory elements, no serial or partially parallel transmission lines separate each image capture element from its corresponding memory elements, which helps to reduce the necessary waiting time between integrations. While the individual memory elements of the memory layers of the depicted embodiment are shown positioned physically over or under their corresponding memory elements in the adjacent layers, it will be appreciated that corresponding memory elements may be physically positioned in any other desired relation to one another. Furthermore, while image capture layer 20 of the depicted embodiment is shown physically formed on the top layer of parallel memory structure 22, image capture layer 20 may also be positioned in any other suitable physical relationship to parallel memory structure 22 without departing from the scope of the present invention.

Parallel memory structure 22 may have as many individual memory layers as desired. The number of memory locations may depend to some extent upon the application in which image capture and storage device 10 is to be used. For example, an image capture and storage device designed for use in a video camera may need many more memory layers than an image capture and storage device designed for use in a still photography camera, due to the large number of frames/second captured by a video camera.

Data flows through the depicted image capture and storage device 10 as follows. First, upon the completion of an integration cycle, data produced by image capture element 26a flows directly into memory element 28a in top memory layer 24a. At the same time, data that was in memory element 28a at the time of the image capture process is transferred to memory element 28b in layer 24b, and data that was in memory element 28b is transferred to memory element 28c in layer 24c. In this manner, the capture of an image causes data in each memory layer to shift down one memory layer, making room in top memory layer 24a for the data from the most recent image capture. Thus, each memory layer 24 represents one frame of data from one image capture process. The downward shift of data in each memory location may be triggered by a pulse generated when a new integration cycle is triggered, or in any other suitable manner.

Data may flow between corresponding memory elements in adjacent layers in any desired manner, including, for example, in serial or parallel format. The design of the interconnection between memory elements may depend to some extent on the format in which data is stored in the memory elements. Typically, each memory element will have enough individual memory locations to store all data produced by a single image capture element during a single integration cycle, typically a single 16- or 32-bit word. Thus, a memory element configured to store a 16-bit digital word will have sixteen individual memory locations, one for each bit. Likewise, a memory element configured to store a 32-bit digital word will have thirty-two individual memory locations.

Where memory elements are configured to transmit data between one another in serial format, a direct path of data flow will typically exist between each individual memory location within each memory element. This is shown in FIG. 3. As indicated, image capture element 26 includes a photodiode 30, an amplifier 32 for strengthening the analog signal from photodiode 30, and an analog-to-digital converter 34 for converting the analog signal from amplifier 32 into a 16-bit digital signal. Image capture element 26 also includes a buffer 36 for converting the 16-bit parallel output from A/D converter 34 to serial form.

The output of buffer 36 feeds into memory element 28a. As shown in FIG. 3, each memory element 28a, 28b, 28c, . . . 28n includes, sixteen individual memory locations 38, one for each bit of data produced by a single exposure of image capture element 26. Individual memory locations 38 are each connected to one another in series, such that a continuous data flow path exists between the memory locations of memory element 28a.

The first memory location within memory element 28a is designated 38a, and the last is designated 38a'. The last memory location 38a' of memory element 28a is connected to the first memory location 38b of memory element 28b. This allows data to flow directly from memory location 38a' in memory element 28a to memory location 38b in memory element 28b. Typically, data will flow such that the entire 16-bit word will move from 28a to 28b. Thus, each bit in memory element 28a shifts downward a total of sixteen memory locations in its move between memory elements. Each memory element within memory structure 22 is connected to subsequent memory elements in the same manner, thus forming a chain of serial memory locations through which image data may move in a first-in-first-out (FIFO) manner. Whenever a new image is captured, all 16 bits of data in each memory element move to the next adjacent memory element downward, allowing the new data to be transferred to top memory element 28a.

On the other hand, where adjacent memory elements are configured to transfer data between one another in parallel, each individual memory location in each memory element will have a direct data flow path to a corresponding individual memory location in each adjacent memory element. Moreover, each individual memory location within each memory element may have no direct data flow path between other memory locations within the same memory element. This is illustrated in FIG. 4, which shows a second embodiment of an image capture element at 126 in electrical communication with a plurality of memory elements, including a first memory element 128a, a second memory element 128b, and a subsequent memory element 128n.

Image capture element 126 includes a photodiode 130, an amplifier 132 and an A/D converter 134 that converts the analog signal from the photodiode to a 16-bit digital format. However, image capture element 126 does not include a buffer for converting the 16-bit digital word to a serial format. Instead, A/D converter 134 has sixteen outputs, each of which is connected to a single memory location of first memory element 128a. Each of the 16 memory locations of first memory element 128a is electrically isolated from the others in the sense that data does not ordinarily move between individual memory locations within the same memory element. However, each memory location is in electrical communication with a corresponding memory location in the adjacent memory element 128b. Thus, data in memory location 138a of memory element 128a can be seen to flow directly into its corresponding memory location 138b of memory element 128b, without flowing through other memory locations in memory element 128a. Each memory element is connected to its corresponding memory elements in adjacent layers in the same fashion, forming a 16-bit wide parallel memory structure for each image capture element 126. Thus, whenever a new image is integrated, all 16 bits of data in each memory element move in parallel to the next adjacent memory element downward, allowing the new data to be transferred to top memory element 128a.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

I claim:

1. An integrated image capture and storage device, comprising:
    a first memory layer, the first memory layer having a plurality of single-pixel first memory elements;
    a second memory layer disposed beneath the first memory layer, the second memory layer having a plurality of single-pixel second memory elements; and
    an image capture layer disposed above the first and second memory layers, the image capture layer having a plurality of single-pixel image capture elements, wherein each image capture element is in direct electrical communication with a corresponding first memory element to allow pixel data generated by each image capture element to be stored in the corresponding first memory element, and wherein each first memory element is in direct electrical communication with a corresponding second memory element to allow pixel data stored in each first memory element to be moved to the corresponding second memory element.

2. The image capture and storage device of claim 1, wherein each first memory element and second memory element includes a plurality of single-bit memory locations.

3. The image capture and storage device of claim 2, wherein each of the first memory elements and second memory elements includes a sufficient number of single-bit memory locations to store a complete set of data for a single pixel corresponding to a single exposure of a single image capture element.

4. The image capture and storage device of claim 2, wherein each image capture element is configured to transfer bits of data for a single pixel in serial to the corresponding first memory element.

5. The image capture and storage device of claim 1, wherein the plurality of image capture elements are configured to transfer pixel data to the corresponding first memory elements in parallel.

6. The image capture and storage device of claim 5, wherein each image capture element produces plural bits of data upon a single exposure of the image capture element, wherein the first memory elements and second memory elements include a sufficient number of single-bit memory locations to store the plural bits of data, and wherein transfer of bits of data from each of the image capture elements to the corresponding first memory element is accompanied by the transfer of bits of data that are in the single-bit memory locations of the first memory element to corresponding single-bit memory locations of the second memory element.

7. The image capture and storage device of claim 6, wherein the first memory layer is configured to transfer bits of data in the first memory layer to the second memory layer in parallel when the image capture layer transfers the data produced by the image capture process to the first memory layer.

8. The image capture end storage device of claim 1, wherein the image capture and storage device is a CMOS device.

9. An integrated image capture and storage device for a solid state camera, the image capture and storage device comprising:
   a parallel memory structure, the parallel memory structure including a plurality of individual memory layers, each memory layer including a plurality of individual memory elements, wherein each memory element of each layer is in direct electrical communication with a corresponding memory element of an adjacent layer, without passing through another memory element; and
   an image capture structure disposed adjacent a top layer of the parallel memory structure, the image capture structure including a plurality of individual image capture elements, wherein each image capture element is in direct electrical communication with a corresponding memory element in the top layer of the parallel memory structure, without passing through another image capture element.

10. The image capture and storage device of claim 9, wherein each memory element includes a plurality of single-bit memory locations.

11. The image capture and storage device of claim 10, wherein each memory element has a sufficient number of single-bit memory locations to store a complete set of data for a single pixel corresponding to a single exposure of a single image capture element.

12. The image capture and storage device of claim 9, wherein the image capture structure is formed on the top layer of the parallel memory structure.

13. The image capture and storage device of claim 9, wherein the image capture structure is configured to transfer data generated in the image capture structure by an image capture process in parallel from each individual image capture element to each corresponding individual memory element in the top layer of the parallel memory structure.

14. The image capture and storage device of claim 13, wherein the parallel memory structure is configured to transfer data stored in the individual memory elements of the top layer of the parallel memory structure in parallel to the corresponding individual memory elements of a layer adjacent the top layer of the parallel memory structure when new data from the individual image capture structure is transferred to the top layer of the parallel memory structure.

15. The image capture and storage device of claim 14, wherein the device is a CMOS device.

16. The image capture and storage device of claim 9, wherein the plurality of layers of the parallel memory structure are arranged in a stacked arrangement.

17. A solid state camera including an integrated image capture and storage device, the image capture and storage device comprising:
   a first memory layer having a plurality of first memory elements, each configured to store image data corresponding to only a single pixel;
   a second memory layer having a plurality of second memory elements, each configured to store image data corresponding to only a single pixel; and
   an image capture layer having a plurality of image capture elements, each image capture element including a light sensitive portion for generating image data for only a single pixel and an active electronic component for processing image data for only a single pixel;
   wherein data flows from each image capture element directly to only a single corresponding first memory element of the plurality of first memory elements, without passing through another image capture element, and wherein data flows from each first memory element directly to only a single corresponding second memory element of the plurality of second memory elements, without passing through another first memory element.

18. The camera of claim 17, wherein each memory element includes a plurality of single-bit memory locations.

19. The camera of claim 17, wherein the first memory layer is formed on top of the second memory layer.

20. The camera of claim 17, wherein the image capture layer is formed on top of the first memory layer.

21. The camera of claim 17, wherein the first memory layer and the second memory layer have the same number of memory elements.

22. The camera of claim 17, wherein the image capture and storage device is a CMOS image capture and storage device.

23. The camera of claim 17, wherein each of the first memory elements and the second memory elements includes a sufficient number of single-bit memory locations to store pixel data generated by a single exposure of a single image capture element.

24. The camera of claim 23, wherein each memory location of each of the first memory elements is electrically isolated from the other memory locations of the first memory element and is in electrical communication with a corresponding memory location of the corresponding second memory element.

* * * * *